US010436352B2

(12) United States Patent
Peterson et al.

(10) Patent No.: US 10,436,352 B2
(45) Date of Patent: Oct. 8, 2019

(54) CONDUIT CLAMP

(71) Applicant: R.A. PHILLIPS INDUSTRIES, INC., Santa Fe Springs, CA (US)

(72) Inventors: Thomas Dale Peterson, Glendora, CA (US); John Brett Titcomb, San Dimas, CA (US); Jeffrey Daniel McKeown, Banner Elk, NC (US)

(73) Assignee: R. A. PHILLIPS INDUSTRIES, INC., Santa Fe Springs, CA (US)

( * ) Notice: Subject to any disclaimer, the term of this patent is extended or adjusted under 35 U.S.C. 154(b) by 0 days.

(21) Appl. No.: 15/808,642

(22) Filed: Nov. 9, 2017

(65) Prior Publication Data
US 2019/0137008 A1 May 9, 2019

(51) Int. Cl.
*F16L 3/10* (2006.01)
*F16L 3/22* (2006.01)
*F16L 3/11* (2006.01)

(52) U.S. Cl.
CPC ........... *F16L 3/1075* (2013.01); *F16L 3/105* (2013.01); *F16L 3/11* (2013.01); *F16L 3/22* (2013.01)

(58) Field of Classification Search
CPC . F16L 3/1075; F16L 3/105; F16L 3/22; F16L 3/11
USPC ............... 248/49, 58, 62, 63, 68.1, 74.1
See application file for complete search history.

(56) References Cited

U.S. PATENT DOCUMENTS

| | | | | |
|---|---|---|---|---|
| 3,756,629 A * | 9/1973 | Gibb | ............ | F16L 17/04 285/112 |
| 4,382,570 A * | 5/1983 | Craig | ............ | F16L 3/1008 24/270 |
| 5,366,263 A * | 11/1994 | Hendrickson | ......... | F16L 17/04 24/270 |
| 5,540,465 A * | 7/1996 | Sisk | ............ | F16L 17/04 285/112 |
| 5,742,982 A * | 4/1998 | Dodd | ............ | F16G 11/00 24/16 R |
| 5,988,694 A * | 11/1999 | Brushaber | ........... | F16L 23/06 285/365 |
| D629,016 S * | 12/2010 | Brooks | ........... | D15/5 |
| 7,883,121 B2 * | 2/2011 | Henry | ............ | F16L 23/10 285/367 |
| 7,931,310 B2 * | 4/2011 | Lake | ............ | F16L 17/025 285/111 |

(Continued)

*Primary Examiner* — Muhammad Ijaz
(74) *Attorney, Agent, or Firm* — Lewis Roca Rothgerber Christie LLP

(57) ABSTRACT

A locking conduit clamp includes a first clamping member having an upwardly-bowed body defining a downward upper pocket and having a hinge at a first lateral end of the upwardly-bowed body, a second clamping member having a downwardly-bowed body defining an upward lower pocket and being hingedly coupled to the first clamp member via the hinge at a first lateral end of the downwardly-bowed body, the second clamping member being configured to rotate about the hinge between an open position for receiving a conduit, and a closed position for surrounding and capturing the conduit in an opening defined by the upper and bottom pockets, and a latch including an arcuate lever hingedly coupled to the second clamping member, and a buckle hingedly coupled to the arcuate lever and configured to engage the first clamping member to lock the first and second clamping members in a locked position.

20 Claims, 12 Drawing Sheets

(56) References Cited

U.S. PATENT DOCUMENTS

| | | | |
|---|---|---|---|
| 8,328,457 B2* | 12/2012 | Werth | A61M 39/1011 |
| | | | 24/16 R |
| 8,464,986 B1* | 6/2013 | McClure | F16L 3/1075 |
| | | | 248/229.13 |
| 8,961,340 B2* | 2/2015 | Boatwright | A63B 60/28 |
| | | | 473/568 |
| 2017/0194781 A1* | 7/2017 | Bentley | H02G 7/125 |

* cited by examiner

CONDUIT CLAMP

BACKGROUND

The present invention relates to the field of conduit management in tractor-trailer vehicles.

A tractor-trailer vehicle, which includes a tractor and a trailer pulled by the tractor, often has a number of electrical cables and air hoses extended between the tractor and trailer. These electrical cables and air hoses, which are henceforth generally referred to as conduits, are secured at each end to relatively moving anchor points at the tractor and trailer. To keep such conduits away from the vehicle's moving parts, the flexible conduits are often suspended from the tractor by one or more harnesses.

What is desired is an effective conduit management system that can safely secure flexible conduits between the tractor and trailer.

The above information disclosed in this Background section is only for enhancement of understanding of the invention, and therefore it may contain information that does not form the prior art that is already known to a person of ordinary skill in the art.

SUMMARY

Aspects of some embodiments of the invention are directed toward a durable conduit clamp for supporting and guiding conduits extending between interconnected vehicle components. The conduit clamp is capable of being securely locked and unlocked with ease. In some embodiments, the locking conduit clamp is capable of suspending and securing together a plurality of conduits, which may be of different sizes, with or without a spiral wrap.

According to some embodiments of the invention, there is provided a locking conduit clamp including: a first clamping member configured to be suspended from a harness and having an upwardly-bowed body defining a downward upper pocket and having a hinge at a first lateral end of the upwardly-bowed body; a second clamping member having a downwardly-bowed body defining an upward lower pocket and being hingedly coupled to the first clamp member via the hinge at a first lateral end of the downwardly-bowed body, the second clamping member being configured to rotate about the hinge between an open position for receiving a conduit, and a closed position for surrounding and capturing the conduit in an opening defined by the upper and bottom pockets; and a latch including an arcuate lever hingedly coupled to the second clamping member, and a buckle hingedly coupled to the arcuate lever and configured to engage the first clamping member to lock the first and second clamping members in a locked position.

In some embodiments, the first clamping member has a catch at a second lateral end of the upwardly-bowed body opposite from the hinge, the catch having a recessed top surface configured to receive the buckle, and the second clamping member has a hook at a second lateral end of the downwardly-bowed body opposite from the hinge, the hook being configured to engage the arcuate lever.

In some embodiments, the arcuate lever includes a hinge portion configured to be received in an opening of the hook to hingedly couple the arcuate lever to the second clamping member.

In some embodiments, an outer circumference of the second clamping member has a recessed portion and a groove at a side of the recessed portion, the recessed portion and groove being configured to receive the arcuate lever when the arcuate lever is in the locked position.

In some embodiments, the arcuate lever has a curvature corresponding to that of the recessed portion and is configured to be received within the recessed portion of the second clamping member when in the locked position, and the buckle includes an arcuate buckle configured to engage a catch of the first clamping member in the closed position.

In some embodiments, a depth of the recessed portion relative to an outer surface of the second clamping member is equal to or less than a height of a tip of the arcuate lever, such that the arcuate lever does not protrude or only partially protrudes above the outer surface of the second clamping member when in a locked position.

In some embodiments, the arcuate lever includes a curved lip extending generally in an axial direction away from a side of a curved body of the arcuate lever, and an end of the curved lip is curved toward the second clamping member is accommodated within the groove, when in the locked position.

In some embodiments, a depth of the groove along the axial direction is less than a thickness of the curved end of the lip, such that, when the lip is received within the groove, a side of the curved end of the lip protrudes beyond a side surface of the second clamping member along the axial direction.

In some embodiments, the second clamping member includes an alignment projection at a second lateral end of the downwardly-bowed body opposite from the hinge, and the first clamping member has an alignment receptacle at a second lateral end of the upwardly-bowed body opposite from the hinge, the alignment receptacle being configured to receive the alignment projection in the closed position to align the first and second clamping members.

In some embodiments, the first and second clamping members have first and second grooves extending along an inner circumference of the first and second clamping members, respectively.

In some embodiments, when in the closed position, the first and second grooves form an annular groove.

In some embodiments, the locking conduit clamp further includes: a gripping member configured to engage with the first and second clamping members and to be accommodated within the opening defined by the upper and bottom pockets when in the closed position, wherein the gripping member is configured to receive a plurality of conduits.

In some embodiments, the gripping member includes a plurality of radial dividers extending radially away from a central axis of the gripping member, each divider of the plurality of radial dividers having a wide outer end and a tapered stem between the wide outer end and a center of the gripping member, and the plurality of radial dividers define a plurality of receptacles therebetween, the plurality of receptacles being configured to receive the plurality of conduits.

In some embodiments, each one of the plurality of receptacles has a concave portion corresponding in shape and size to an outer circumference of a corresponding one of the plurality of conduits.

In some embodiments, the concave portion of each one of the plurality of receptacles is circularly arced.

In some embodiments, at least one of the plurality of receptacles has a size different from an other one of the plurality of receptacles.

In some embodiments, top surfaces of the wide outer ends form circular arcs have a same radius, and the radius of the top surfaces corresponds to an inner radius of the opening defined by the upper and bottom pockets when in the closed position.

In some embodiments, each one of the plurality of radial dividers has a radial projection protruding radially away from a corresponding wider outer end, and the radial projection is configured to be received by first and second grooves of the first and second clamping members.

In some embodiments, the locking conduit clamp further includes: an eyelet with an axially-extending through-hole configured to receive the harness to suspend the eyelet from the harness, wherein the eyelet is coupled to a neck portion of the first clamping member.

In some embodiments, the neck portion of the first clamping member has straight laterally-opposite side edges that are inclined downward and laterally-outward from the eyelet by an angle of 15°-45° relative to a vertical axis.

BRIEF DESCRIPTION OF THE DRAWINGS

The accompanying drawings, together with the specification, illustrate exemplary embodiments of the invention, and, together with the description, serve to explain aspects of embodiments of the invention. In the drawings, like reference numerals are used throughout the figures to reference like features and components. The figures are not necessarily drawn to scale. The above and other features and aspects of the invention will become more apparent from the following detailed description of illustrative embodiments thereof with reference to the attached drawings, in which.

DETAILED DESCRIPTION

The detailed description set forth below is intended as a description of example embodiments of the invention, and is not intended to represent the only forms in which the invention may be constructed or utilized. The description sets forth the features of the invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Aspects of some embodiments of the invention are directed to a conduit clamp for management of air/electrical conduits that extend between components of a vehicle (e.g., extend between a tractor and a trailer). In some embodiments, the conduit clamp includes a gripping member that allows for the securing of a plurality of conduits without the use of a spiral wrap. The conduit clamp may be suspended from a suspension point on the vehicle (e.g., a suspension point on the back of a tractor).

Figure 1A:
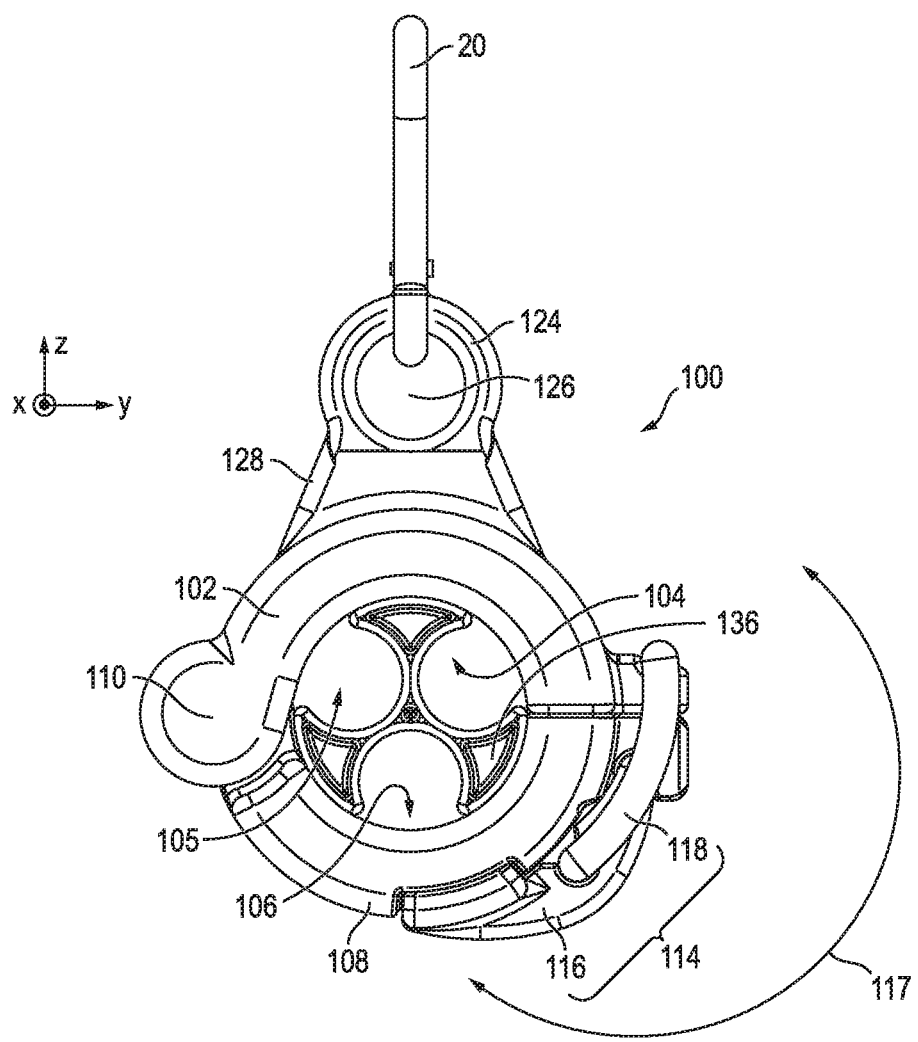
FIGS. 1A-1B illustrate a front view and a perspective view of the locking conduit clamp in a locked position, according to some embodiments of the invention.
Figure 1B:
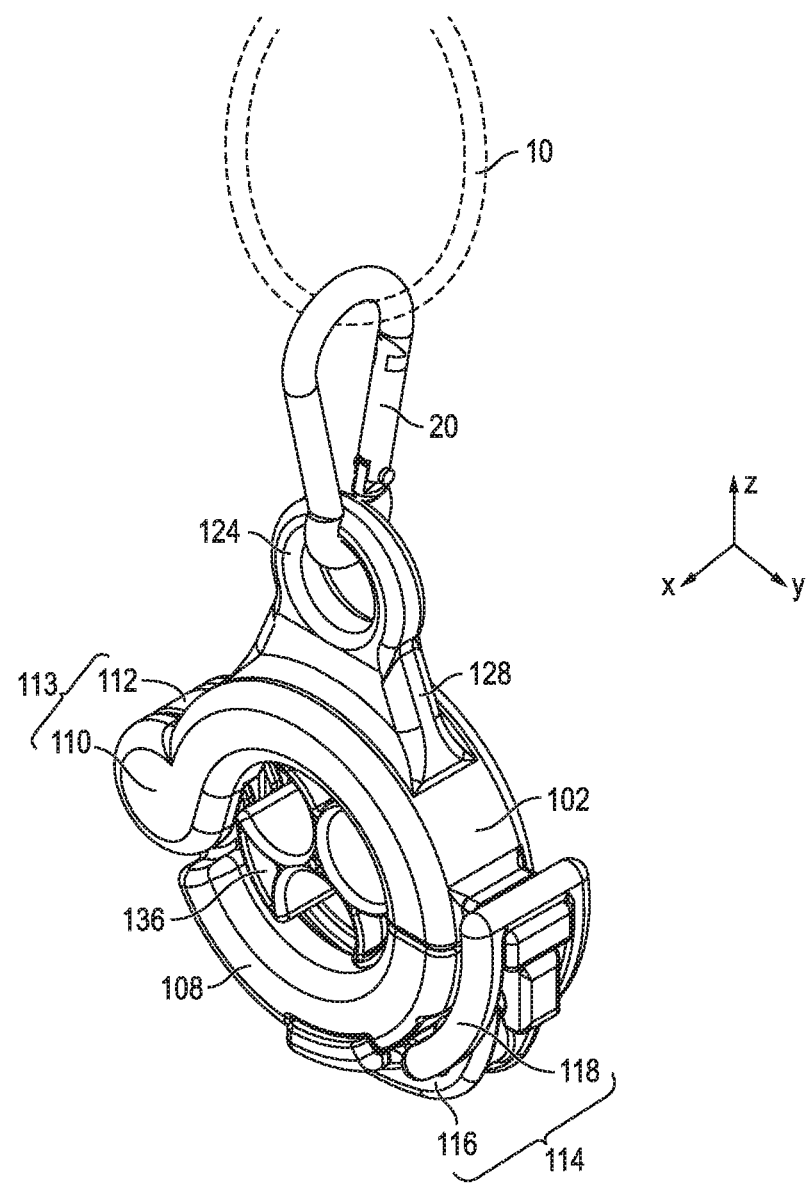
Figure 1C:
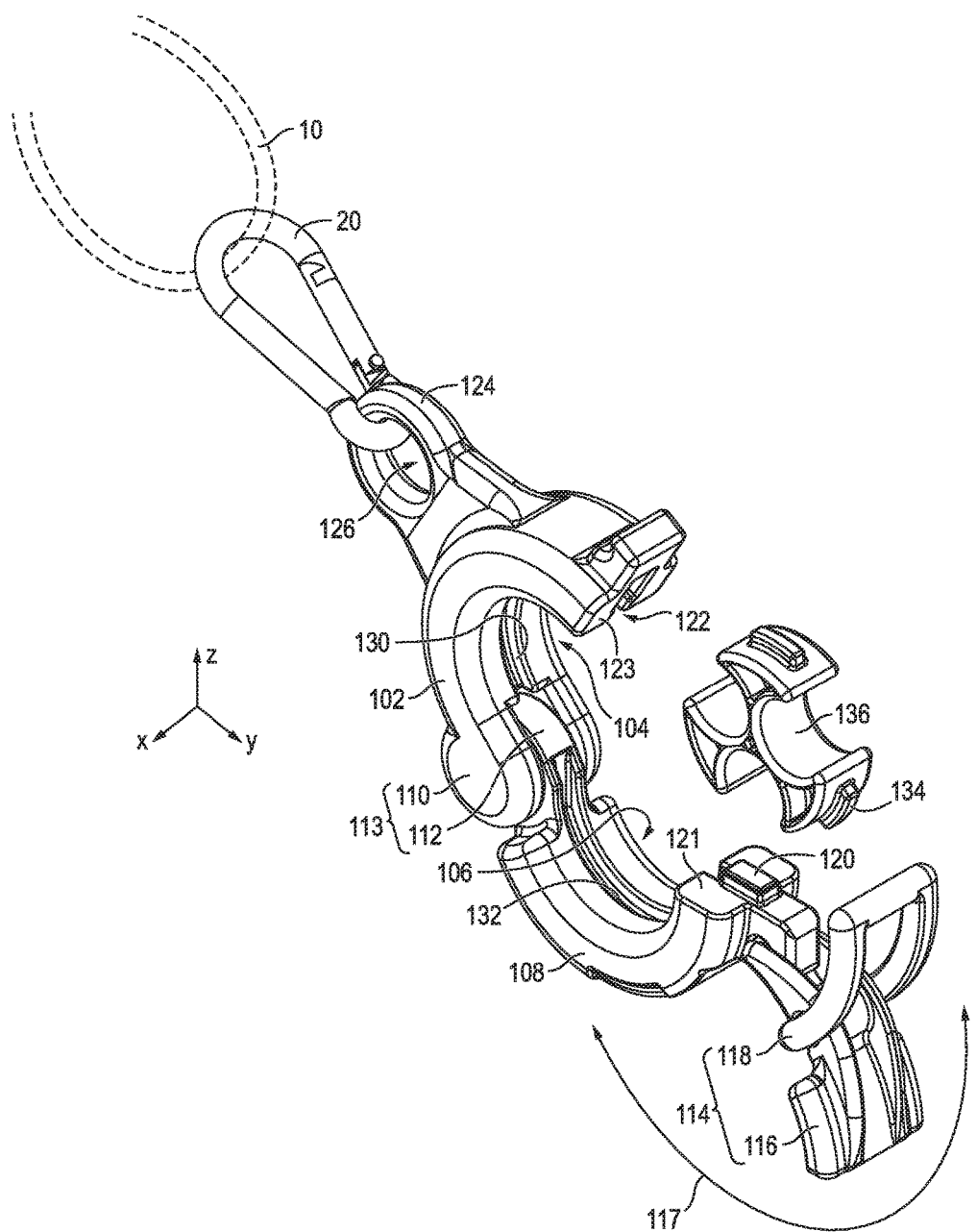
FIG. 1C illustrates a perspective view of the locking conduit clamp in an open position, according to some embodiments of the invention.

FIGS. 1A and 1B illustrate a front view and a perspective view of the locking conduit clamp 100 in a locked position, according to some embodiments of the invention. FIG. 1C illustrates a perspective view of the locking conduit clamp 100 in an open position, according to some embodiments of the invention.

Referring to FIGS. 1A-1C, according to some embodiments, the locking conduit clamp 100 includes a first clamping member 102 having an upwardly-bowed body defining a downward upper pocket 104 and a second clamping member 108 having a downwardly-bowed body defining an upward lower pocket 106. The first clamping member has a first hinge portion 110 at a first lateral end of the upwardly-bowed body, and the second clamping member 108 has a second hinge portion 112 at a first lateral end of the downwardly-bowed body. The first and second hinge portions 110 and 112 together form a hinge 113 that rotatably (e.g., hingedly) couples the first and second clamping members 102 and 108 together.

The first and second clamping members 102 and 108 are configured to rotate about a hinge axis (e.g., the axial direction or the X axis) between an open position for receiving one or more conduits, and a closed position for surrounding and capturing the one or more conduits in an opening (e.g., a circular opening or through-hole) 105 defined by the upper and lower pockets 104 and 106.

In some embodiments, when in the closed position, the upwardly curved body of the first clamping member 102 and the downwardly curved body of the second clamping member 108 form a generally annular body with a central axis along an axial direction (e.g., the X axis). The axial direction may be the direction along which the one or more conduits generally extend when captured in the opening 105 of the locking conduit clamp 100, when in a closed position. In some examples, the annular body may have an inner radius of about 0.5 inches to about 1 inch (e.g., about 0.8 inches), and an outer radius of about 1 inch to about 2 inches (e.g., about 1.4 inches). In some examples, the first and second clamping members 102 and 108 may be about 0.7 inches to about 1.5 inches (e.g., about 1 inch) thick (e.g., along the axial direction or X axis).

The locking conduit clamp 100 further includes a latch (e.g., an overcenter latch) 114 for locking the first and second clamping members 102 and 108 in a closed position (the locked state of the first and second clamping members and the latch will hereinafter be referred to as the locked position). In some embodiments, the latch 114 includes an arcuate lever (e.g., a handle) 116 hingedly coupled to the second clamping member 108, and a buckle 118 hingedly coupled to the arcuate lever 116 and configured to engage the first clamping member 102 to lock the first and second clamping members 102 and 108 in a locked position. The arcuate lever 116 traverses about an axis of rotation (along the axial direction or the X axis), at its point of connection to the second clamping member 108, in an arc of rotation 117 that extends from a fully locked position (see, e.g., FIG. 1A) to an unlocked position (see, e.g., FIG. 1C).

According to some embodiments, the relative movement of the first and second clamping members 102 and 108 along the axial direction (e.g., the X axis) are restricted by the hinge 113 and an alignment feature of the first and second clamping members 102 and 108. In some embodiments, the second clamping member 108 includes an alignment projection 120 at a second lateral end thereof, which is opposite from the hinge 113. The alignment projection 120 may protrude out of a top surface 121 of the upwardly curved body toward the first clamping member 102 (e.g., may project in the vertical direction or Z axis, when in the closed position).

When in a closed position, the alignment projection 120 is received within an alignment receptacle 122 at a second lateral end of the upwardly-curved body of the first clamping member 102, which is opposite from the hinge 113, in order to align the first and second clamping members 102 and 108. The alignment receptacle 122 may be an inward depression from the bottom surface 123 at the second lateral end of the downwardly-curved body of the first clamping member 102. The alignment receptacle 122 corresponds in size and shape to the alignment projection 120 and is configured to accommodate (e.g., fit) the alignment projection 120 when in the closed position. In some examples, the external dimensions of the alignment projection 120 may be the same as or slightly less than the inner dimensions of alignment receptacle 120 to facilitate easy insertion/removal. In other examples, the external dimensions of alignment projection 120 may slightly exceed the inner dimensions of the alignment receptacle 122, causing an interference fit (e.g., press fit or friction fit) that resists the opening of the locking conduit clamp 100 once it is closed. The alignment projection 120 may fully fit within the alignment receptacle 122 such that the top and bottom surfaces 121 and 123 come into contact (and form a positive stop) when the conduit clamp 100 is closed. In some examples, the external dimensions of the alignment projection 120 may be about 0.1 inches to about 0.9 inches (e.g., about 0.45 inches) long (e.g., along the transverse direction or Y axis), about 0.1 inches to about 0.4 inches (e.g., about 0.25 inches) wide (e.g., along the axial direction or X axis), and about 0.1 inches to about 0.3 inches (e.g., about 0.3 inches) high (e.g., along the vertical direction or Z axis). The inner dimensions of the alignment receptacle 122 may be set appropriately as described above.

The locking conduit clamp 100 (e.g., the first clamping member 108) is capable of being suspended from a harness 10 coupled to an anchor point (e.g., at a back of a trailer). In some examples, the locking conduit clamp 100 further includes an eyelet 124 with an axially-extending opening (e.g., through-hole) 126 configured to receive the harness 10 or a clip/shackle (e.g., a carabiner) 20 coupled to the harness 10 to suspend the eyelet 124 from the harness 10. The eyelet 124 may be coupled to a neck portion 128 of the first clamping member 102. In some examples, the neck portion 128 may have laterally-opposite side edges that are inclined downward and laterally-outward from the eyelet 124 to the upward curved body of the first clamping member 102.

In some examples, the angle of inclination of the laterally-opposite side edges of the neck portion 128 may be about 30° to about 60° (e.g., about 45°) with respect to the vertical direction (e.g., the Z axis), and the opening 126 of the eyelet 124 may be about 0.5 inch to about 1 inch (e.g., about 0.75 inches).

According to some embodiments, the first clamping member 102 has a first groove 130 extending along an inner circumference thereof, and the second clamping member 108 has a corresponding second groove 132 extending along an inner circumference thereof. In some examples, when in a closed position, the first and second grooves 130 and 132 may together form a partial annular groove. In some examples, the first and second grooves 130 and 132 may be about 0.1 inches to about 0.3 inches (e.g., about 0.15 inches) deep (e.g., along a radial direction) and about 0.1 inches to about 0.2 inches (e.g., about 0.17 inches) wide (e.g., along the axial direction or the X axis).

In some embodiments, the first and second grooves 130 and 132 are configured to accommodate radial projections 134 of a gripping member 136, thus allowing the locking conduit clamp 100 to accommodate the gripping member 136 within the opening 105. The gripping member 136 is configured to receive a plurality of conduits, each of which may have a diameter less than (e.g., substantially less than) the diameter of the opening 105 defined by the upwardly-curved body of the first clamping member 102 and the downwardly-curved body of the second clamping member 108.

In addition to accommodating the radial projections 134 of the gripping member 136, the first and second grooves 130 and 132 are configured to restrain movement of the gripping member 136 along the vertical and transverse directions (i.e., the Z and Y axes, respectively) and, in some embodiments, to allow rotation of the gripping member 136 along a central axis of the opening 105 (i.e., the axial direction or X axis).

According to some examples, in order to protect the conduit clamp 100 from corrosion while ensuring sufficient durability, the components of the conduit clamp 100 may be made of a rigid plastic, such as glass-filled polymer (e.g., glass-filled nylon or polyethylene), and/or the like. However, embodiments of the invention are not limited thereto, and at least some of the components of the conduit clamp 100 may be made of metal or any other suitable material.

Figure 2A:
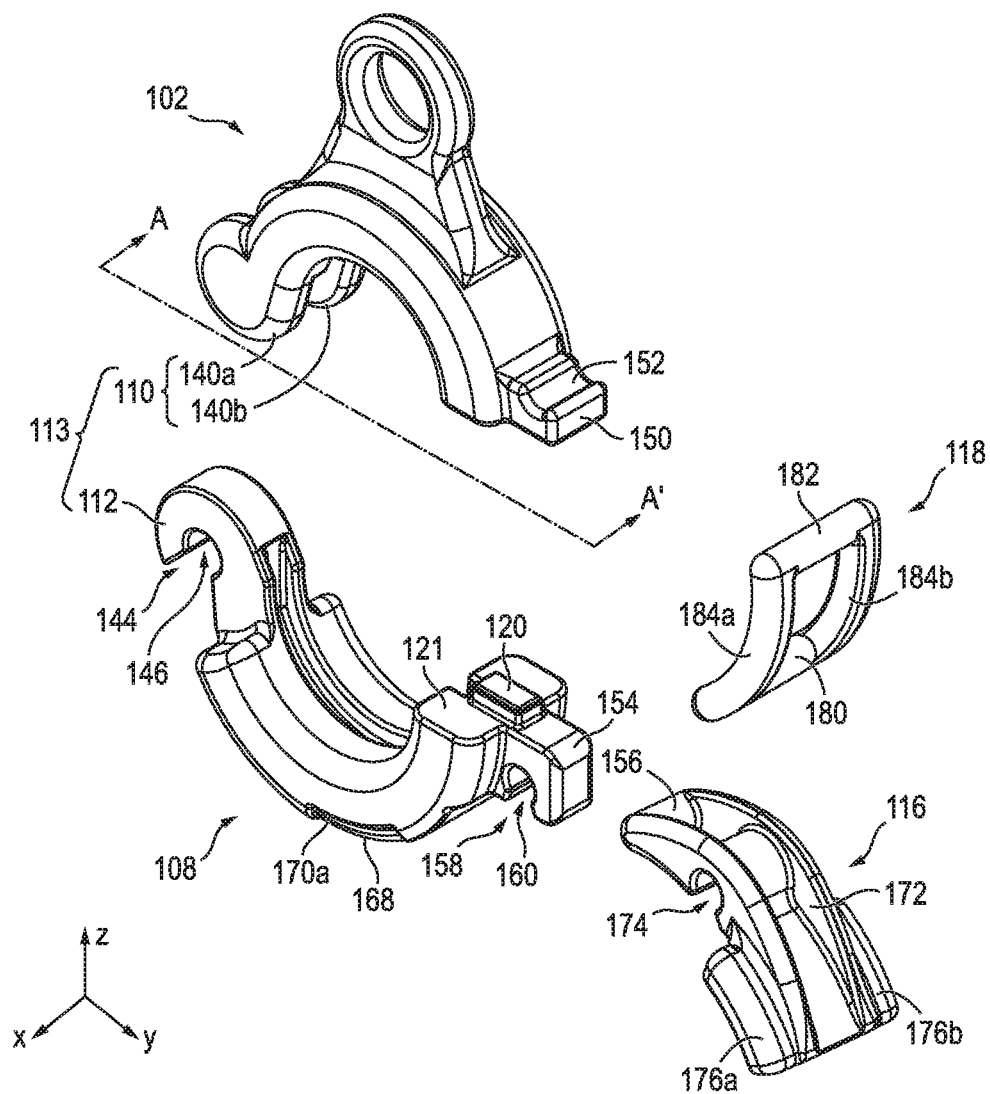
FIGS. 2A-2B illustrate two different exploded perspective views of the conduit clamp, according to some exemplary embodiments of the invention.
Figure 2B:
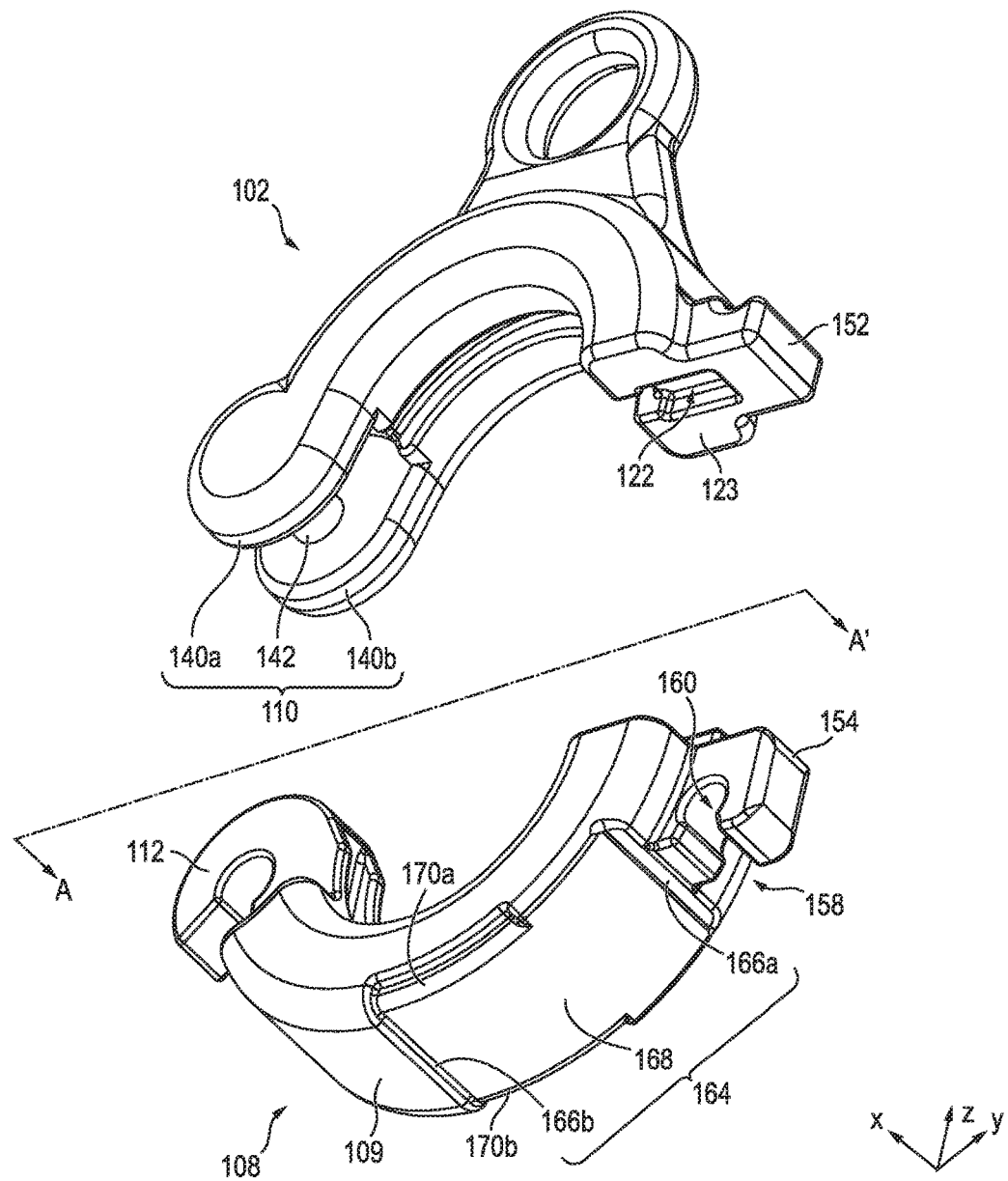
Figure 2C:
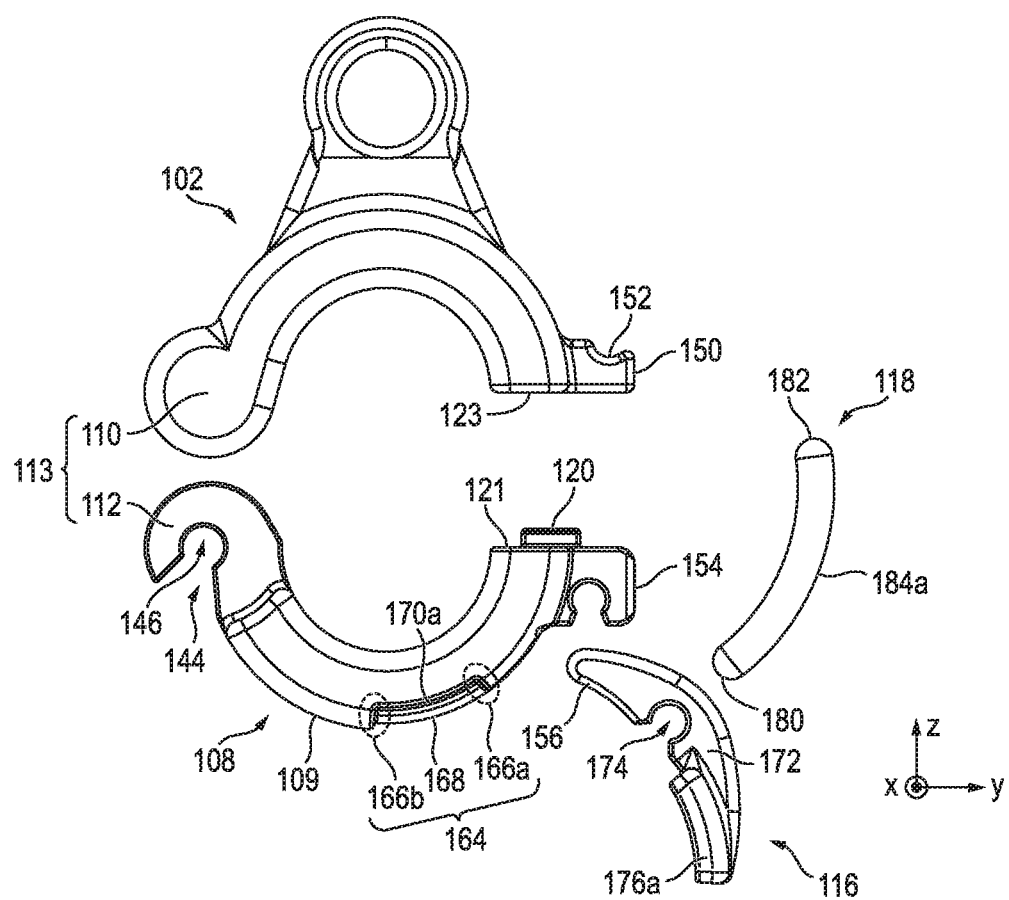
FIGS. 2C-2D respectively illustrate a front exploded view of the conduit clamp and a cross-sectional exploded view of the conduit clamp along the line A-A' of FIG. 2B, according to some exemplary embodiments of the invention.
Figure 2D:
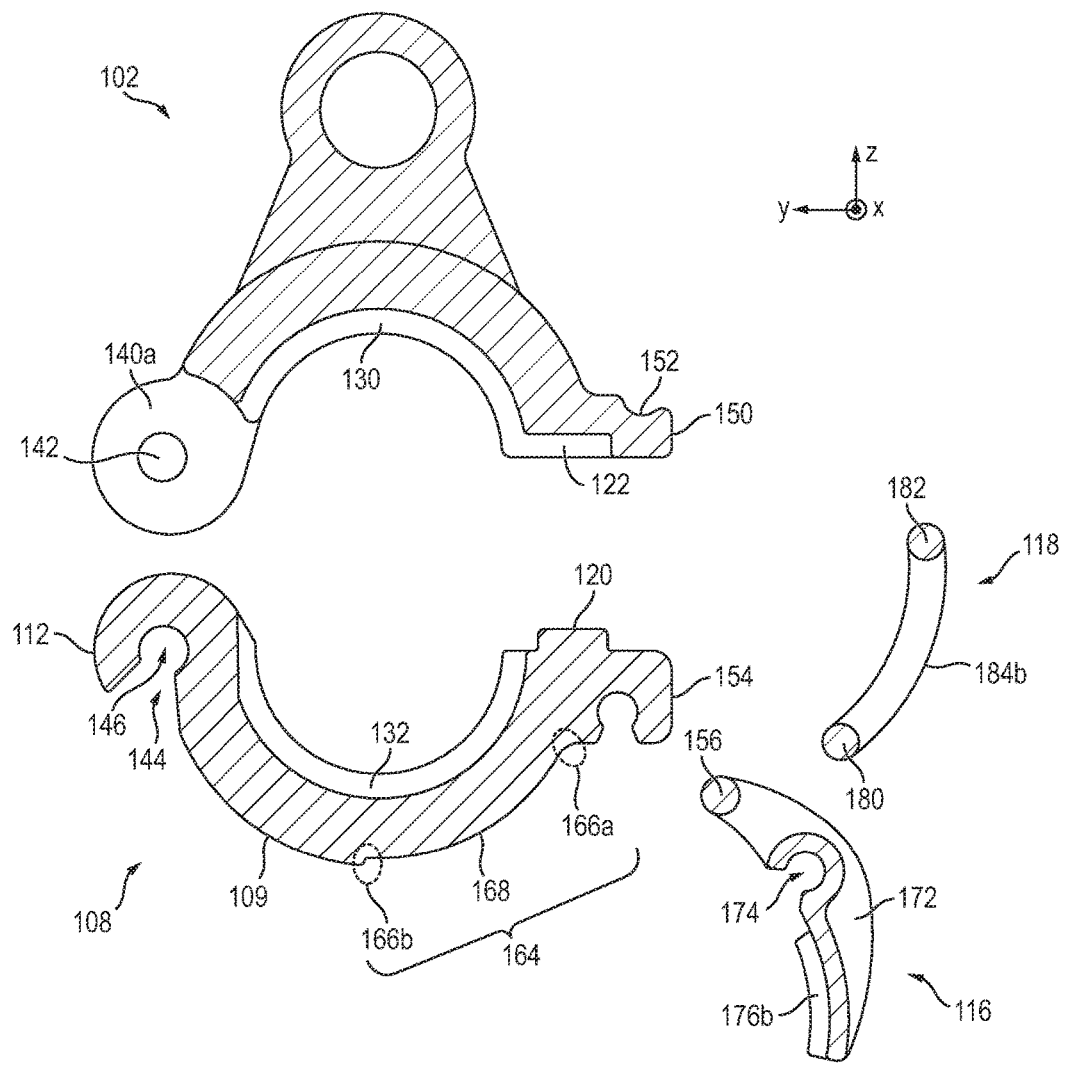
Figure 3A:
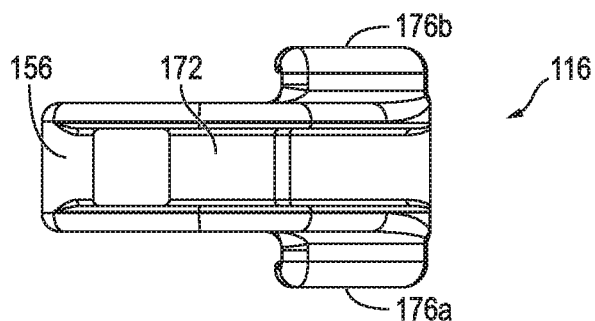
FIGS. 3A-3C respectively illustrate a top view, a first perspective view, and a second perspective view of an arcuate lever of the conduit clamp, according to some exemplary embodiments of the invention.
Figure 3B:
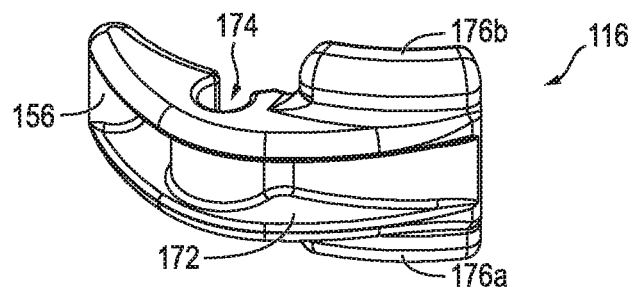
Figure 3C:
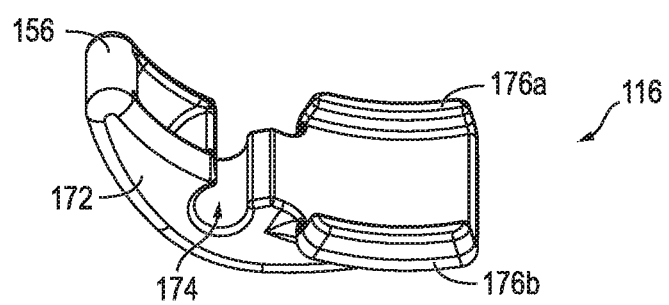

FIGS. 2A-2B illustrate two different exploded perspective views of the conduit clamp 100, according to some exemplary embodiments of the invention. FIGS. 2C-2D respectively illustrate a front exploded view of the conduit clamp 100 and a cross-sectional exploded view of the conduit clamp 100 along the line A-A' of FIG. 2B, according to some exemplary embodiments of the invention. FIGS. 3A-3C respectively illustrate a top view, a first perspective view, and a second perspective view of the arcuate lever 116, according to some exemplary embodiments of the invention.

Referring to FIGS. 2A-2C, in some examples, the first hinge portion 110 includes first and second hinge portions 140a and 140b forming a gap therebetween, and a hinge pin 142 extending axially (i.e., along the X axis) within the gap and fixedly coupled between first and second hinge portions 140a and 140b. The second hinge portion 112 may be a hinge knuckle configured to rotatably couple to the hinge pin 142.

The hinge knuckle 112 may be generally c-shaped and have an inner opening 144 to the knuckle hole (e.g., through-hole) 146 with a width that is smaller than the diameter of the knuckle hole 146, which is the same as (or substantially the same as) the diameter of the hinge pin 142. As the hinge pin 142 is forced toward the knuckle hole 146, the opening 144 may widen sufficiently to allow the hinge pin 142 to pass through and into the knuckle hole 146. After the hinge pin 142 snaps into the knuckle hole 146, the opening 144 returns to its initial (e.g., original) width, thus locking the hinge pin 142 within the knuckle hole 146.

Embodiments of the invention are not limited to the particular hinge described above and illustrated in the figures. For example, the first and second hinge portions 140a and 140b and the hinge pin 142 may be part of the second hinge portion 112 of the second clamping member 108, and the knuckle may be part of the first hinge portion 110 of the first clamping member 102. Further, any other suitable hinge may be utilized to hingedly couple the first and second clamping members 102 and 108.

Referring still to FIGS. 2A-2B, according to some embodiments, the first clamping member has a catch 150 at a second lateral end of the upwardly-bowed body of the first clamping member 102, which is opposite from the hinge 113. The catch 150 has a recessed top surface 152 configured to receive the buckle 118 (e.g., when the latch 114 is in a locked position). The second clamping member 108 has a hook 154 at a second lateral end of the downwardly-bowed body of the second clamping member 108, which is opposite from the hinge 113. The hook 154 is configured to engage the lever hinge 156 of the arcuate lever 116 and to hingedly couple the arcuate lever 116 to the second clamping member 108.

The hook 154 may be curved away from the first clamping member 102 and have an inner opening 158 to the hook hole (e.g., through-hole) 160 with a width that is smaller than the diameter of the hook hole 160, which is the same as (or substantially the same as) the diameter of the lever hinge 156. As the lever hinge 156 is forced toward the hook hole 160, the opening 158 may widen sufficiently to allow the lever hinge 156 to pass through and into the hook hole 160. After the lever hinge 156 snaps into the hook hole 160, the opening 158 returns to its initial (e.g., original) width, thus locking the lever hinge 156 within the hook hole 160.

According to some embodiments, an outer circumference of the second clamping member 108 (at its bottom portion) has a recessed portion (or depressed region) 164 curvedly extending from the second lateral end of the second clamping member 108 toward its first lateral end. The recessed portion 164 defines a first step 166a at a first end thereof, which may be at or near the base of the hook 154, a second step 166b at a second end thereof, which may be at a central point along the outer circumference of the second clamping member 108, and a stop surface 168 between the first and second steps 166a and 166b. In some examples, the stop surface 168 may have an outer curvature corresponding to (e.g., matching or substantially matching) that of the second clamping member 108 and may have a radius of curvature that is less than (e.g., slightly less than) that of the outer circumference of other portions of the second clamping member 108. For example, the stop surface 168 may be recessed from the outer surface 109 of the second clamping member 108 by about 0.03 inches to about 0.1 inches (e.g., about 0.05 inches). The stop surface 168 may function as a stop surface that limits the arc of rotation of the arcuate lever 116 about the axis of the hook 154 to a locked position.

In some embodiments, the recessed portion 164 has first and second grooves 170a and 170b on its sides, which curvedly extend along a portion of opposite edges of the stop surface 168. The recessed portion 164 and the grooves 170a and 170b are configured to (e.g., shaped to) receive and accommodate the arcuate lever 116 to allow at least the tip of the arcuate lever 116 to rest within, as opposed to resting on top of, the body of the second clamping member 120 when in a locked position. In some examples, the depth of the recessed portion relative to the outer surface 109 of the second clamping member 108 may be equal to or less than the height of the tip of the arcuate lever 116, so that the arcuate lever 116 may not be protruding or may only be slightly protruding above the outer surface 109 of the second clamping member 108 when in a locked position. This reduces the likelihood of the latch 114 being inadvertently unlocked as a result of an unwanted forceful (transversal) contact with the tip of the arcuate lever 116 or as a result of an object penetrating the underside of the arcuate lever 116 and lifting it against the second clamping member 108.

In some embodiments, the arcuate lever 116 has a curved body 172 having a curvature corresponding to that of the second clamping member 108. The arcuate lever 116 may further have a lever opening 174 for engaging (e.g., for receiving) the buckle 118 and for hingedly coupling the arcuate lever 116 to the buckle 118.

In some embodiments, the arcuate lever 116 includes a pair of curved lips 176a and 176b that extend generally in the axial direction away from the sides of the curved body 172. The ends of the curved lips 176a and 176b may be curved toward the second clamping member 108 and are accommodated within (e.g., partially fit within) the first and second grooves 170a and 170b, when in the locked state. According to some embodiments, the depths of the first and second grooves 170a and 170b along the axial direction may be less than the thickness of the curved ends of the lips 176a and 176b, such that, when the lips 176a and 176b are received within the first and second grooves 170a and 170b, the sides of the curved ends of the lips 176a and 176b protrude beyond the side surfaces of the second clamping member 108 along the axial direction. This side protrusion of the curved lips 176a and 176b provide an easy means for a user to grip the arcuate lever 116 and to lift the arcuate lever 116 against the second clamping member 108 to disengage the latch 114 and unlock the conduit clamp 100. In some examples, the outer sides of the ends of the curved lips 176a and 176b, which may act as grip surfaces for the arcuate lever 116, may be textured (e.g., have a bumped texture) to increase grip friction and facilitate easier release of the latch 114 by the user.

In some examples, the ends of the lips 176a and 176b may axially separated by about 0.8 inches to about 1 inch (e.g., about 0.915 inches), and each may have a thickness along the axial direction of about 0.1 inches to about 0.15 inches (e.g., about 0.13 inches). The side grooves 170a and 170b may be about 0.05 inches to about 0.1 inches (e.g., about 0.08 inches) deep along the axial direction (e.g., the X axis).

The buckle 118 may also be an arcuate buckle with a curvature generally corresponding to the curvature of first and second clamping member 102 and 108 when in a closed position. In some embodiments, the buckle is in the form of a bowed frame with an axially extending buckle hinge (e.g., a first cross-bar) 180 and an axially extending bar (e.g., a second cross-bar) 182 coupled together by two curved (e.g., bowed or bent) arms (e.g., side bars) 184a and 184b extending (e.g., curvedly extending) from opposite ends of the buckle hinge 180 to corresponding ends of the axially extending bar 182. The buckle hinge 180 is configured to hingedly couple the buckle 118 to the arcuate lever 116. In some examples, the first and second cross-bars 180 and 182 may be separated by about 1.2 inches to about 1.6 inches (e.g., about 1.4 inches), and the arms 184a and 184b may be separated by about 0.5 inches to about 0.7 inches (e.g., about 0.6 inches). The bow of the buckle 118 may have an arc radius of about 1.1 inches to about 1.6 inches (e.g., about 1.4 inches).

However, embodiments of the invention are not limited thereto, and the buckle may have a flat (e.g., unbent/unbowed) frame, or may have any suitable shape. For example, the buckle 118 may be a hasp (e.g., a slotted hinged plate) or any other suitable fastening or securing mechanism.

Figure 4A:
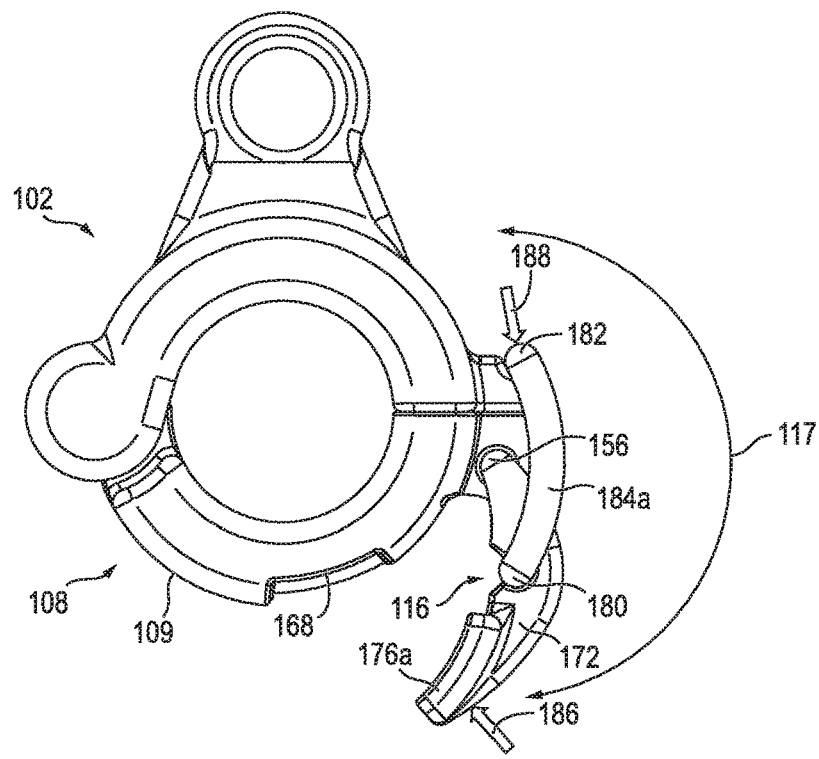
FIGS. 4A-4B illustrate the conduit clamp in an unlocked and locked state, according to some embodiments of the invention.
Figure 4B:
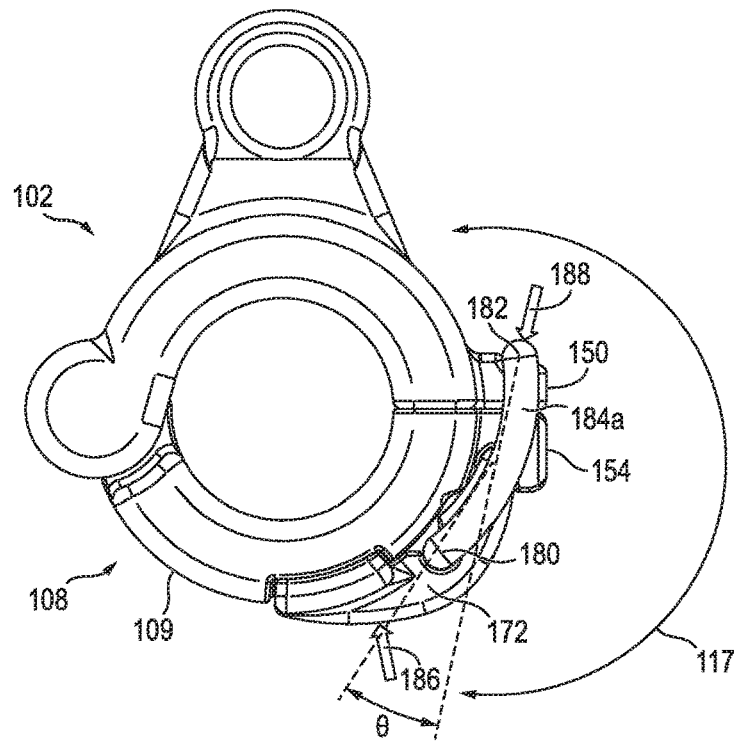

FIGS. 4A-4B illustrate the locking process of the conduit clamp 100, according to some embodiments of the invention. FIG. 4A illustrates the conduit clamp 100 in a closed but unlocked state, and FIG. 4B illustrates the conduit clamp 100 in a closed and locked state, according to some embodiments of the invention.

When force 186 is applied to the arcuate lever 116, it rotates about the lever hinge 156 in the arc 117 toward the recessed portion 164 of the second clamping member. If the axially extending bar 182 rests within the catch 150 of the first clamping member 102, the downward resultant force 188 on the recessed top surface 152 of the catch 150 urges the first clamping member 102 toward the second clamping member 108, thus bringing the top and bottom surfaces 121 and 123 closer together (e.g., in contact with one another) and closing the conduit clamp 100. The downward resultant force 188 increases to its maximum the recessed top surface 152 as the axially extending bar 182, the lever hinge 156, and the buckle hinge 180 become aligned.

The continued application of force 186 to the arcuate lever 116 further drives the arcuate lever 116 toward the recessed portion 164 until it is stopped by the stop surface 168. Once the lever hinge 156 proceeds beyond alignment with the axially extending bar 182 and the buckle hinge 180, the reaction to the downward resultant force 188 on the recessed top surface 152 of the catch 150 urges the arcuate lever 116 to contact the stop surface 168 and to maintain the resultant force 188 at the top surface 152 of the catch 150 to couple (e.g., lock) the first and second clamping members 102 and 108 in a locked position.

In some examples, when in a locked state, the angle θ between an imaginary line connecting the axially extending bar 182 and the lever hinge 156 and the imaginary line connecting the lever hinge 156 and the buckle hinge 180 may be less than about 25 degrees in order to ensure that the forces applied to lock and release the latch 114 do not unduly stress the latch 114 or cause it to break.

Figure 5A:
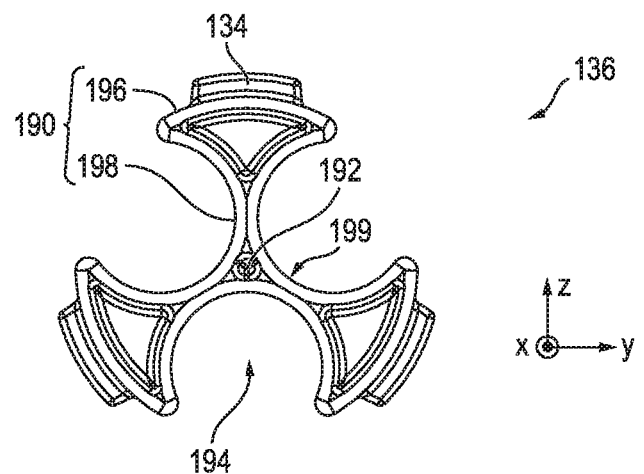
FIGS. 5A-5B respectively illustrate a front view and a perspective view of a gripping member of the conduit clamp, according to some exemplary embodiments of the invention.
Figure 5B:
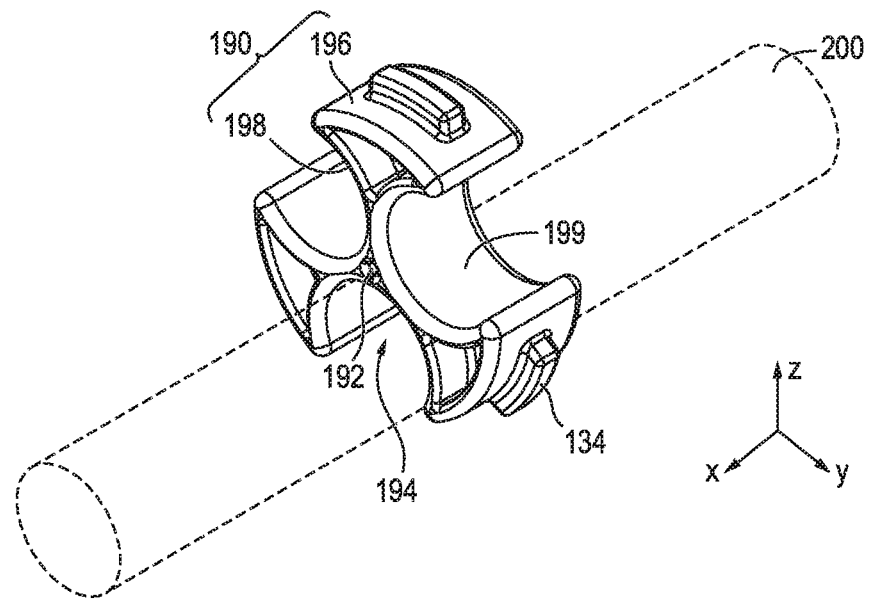

FIGS. 5A-5B respectively illustrate a front view and a perspective view of the gripping member 136, according to some exemplary embodiments of the invention.

In some embodiments, the gripping member 136 includes a plurality of radial dividers 190 extending radially away from a center 192 of the gripping member 136 and defining a plurality of receptacles 194 therebetween. Each one of the plurality of radial dividers 190 has a wide outer end 196 and a tapered stem 198 between the wide outer end 196 and the center 192 of the gripping member. In some embodiments, the tapered stems 198 have a funnel-shaped profile and define concave (e.g., circularly arced) receptacles 194 therebetween, which are configured to receive a plurality of conduits 200 (e.g., air and/or electric hoses). The concave portion 199 of each of the receptacles 194 may correspond in shape and size to an outer circumference of a corresponding one of the plurality of conduits 200.

The top surfaces of the wide outer ends 196 may be arced, and, in some examples, may form circular arcs having the same radius, which may be set to correspond to (e.g., be substantially equal to) the inner radius of the opening 105 of the conduit clamp 100 when closed. For example, the radius of the top surfaces of the wide outer ends 196 may be about 0.5 inches to about 1 inch (e.g., about 0.8 inches). Adjacent wide outer ends 196 may be sufficiently distanced from one another to allow a conduit 200 to be inserted in the corresponding receptacle 194. The wide outer ends 196 may be about 0.4 inches to about 0.8 inches (e.g., about 0.6 inches) thick along the axial direction or X axis.

According to some embodiments, each one of the plurality of radial dividers 190 has a radial projection 134 protruding radially away from the corresponding wide outer end 196. Each of the radial projections 134 is configured to be received by first and second grooves 130 and 132 of the first and second clamping members 102 and 108. The outer dimensions of the projections may be sized to fit within (and, e.g., to move smoothly within) the first and second grooves 130 and 132. For example, each projection 134 may have a height of about 0.08 inches to about 0.3 inches (e.g., about 0.11 inches) along a radial direction and a width of about 0.1 inches to about 0.2 inches (e.g., about 0.15 inches) along the axial direction or X axis.

As shown in the examples of FIGS. 5A-5B, the gripping member 136 may include three identical radial dividers 190 separated at about 120° angles, which define three identical circularly-arced receptacles. However, embodiments of the invention are not limited thereto. For example, the gripping member 136 may include any suitable number of radial dividers 190 and corresponding receptacles 194 to receive any desirable number of conduits 200 that fit within the opening 105 of the conduit clamp 100 when closed. Further, at least one of the receptacles 194 may be different in size from the other receptacles 194. Furthermore, the receptacles 194 may have any suitable cross-sectional shape to accommodate any suitable conduit 200.

In some embodiments, the gripping member 136 may be a disk with openings formed therein to receive one or more conduits 200.

Figure 6A:
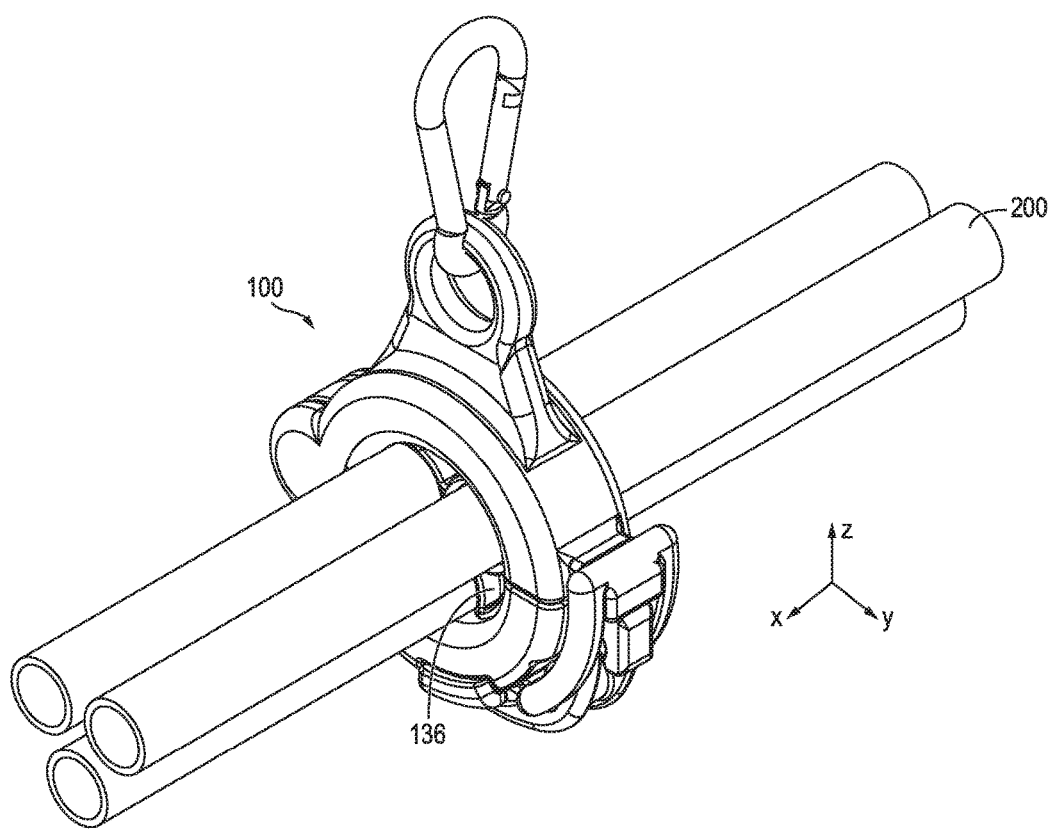
FIGS. 6A and 6B illustrate different applications of the conduit clamp with and without the gripping member, respectively, according to some exemplary embodiments of the invention.
Figure 6B:
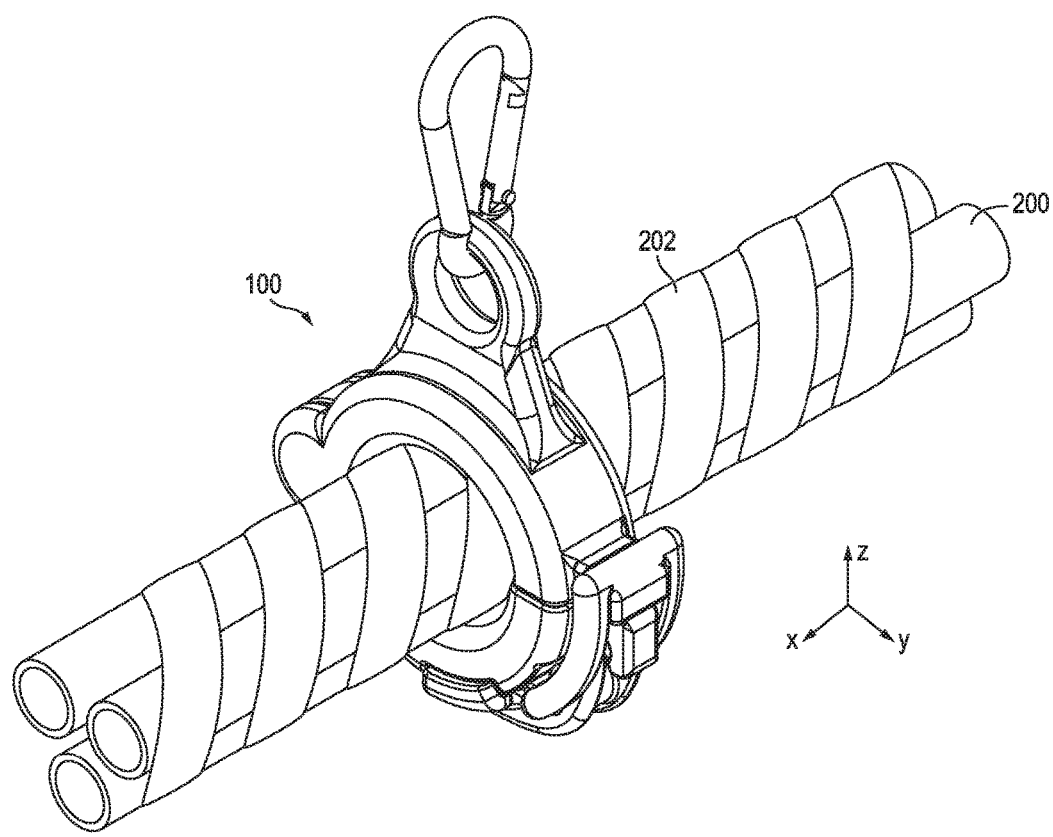

FIGS. 6A and 6B illustrate different applications of the conduit clamp with and without the gripping member 136, respectively, according to some exemplary embodiments of the invention.

As illustrated in FIG. 6A, the gripping member 136 of the conduit clamp 100 may be utilized to accommodate and secure together different conduits 200, without the use of a separate spiral wrap. FIG. 6B illustrates the use of the conduit clamp 100 to secure together different conduits 200 using a spiral wrap 202, and without a gripping member 136.

Accordingly, embodiments of the invention provide a durable conduit clamp for supporting and guiding conduits that are extended between interconnected vehicle components. The conduit clamp is capable of being securely locked and released with ease. By utilizing a gripping member, the locking conduit clamp is capable of suspending and securing together a plurality of conduits, which may be of different sizes, without a spiral wrap.

While this invention has been described in detail with particular references to exemplary embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. When an element or layer is referred to as being "directly on", "directly connected to", "directly coupled to", or "immediately adjacent to" another element or layer, there are no intervening elements or layers present.

As used herein, the terms "use", "using", and "used" may be considered synonymous with the terms "utilize", "utilizing", and "utilized", respectively.

What is claimed is:

1. A locking conduit clamp comprising:
   a first clamping member configured to be suspended from a harness and having an upwardly-bowed body defining a downward upper pocket and having a hinge at a first lateral end of the upwardly-bowed body;
   a second clamping member having a downwardly-bowed body defining an upward lower pocket and being hingedly coupled to the first clamp member via the hinge at a first lateral end of the downwardly-bowed body, the second clamping member being configured to rotate about the hinge between an open position for receiving a conduit, and a closed position for surrounding and capturing the conduit in an opening defined by the upper and bottom pockets; and
   a latch comprising an arcuate lever hingedly coupled to the second clamping member, and a buckle hingedly coupled to the arcuate lever and configured to engage the first clamping member to lock the first and second clamping members in a locked position,
   wherein an outer circumference of the second clamping member has a recessed portion and a groove at an exterior side of the recessed portion, the recessed portion and groove being configured to receive the arcuate lever when the arcuate lever is in the locked position.

2. The locking conduit clamp of claim 1, wherein the first clamping member has a catch at a second lateral end of the upwardly-bowed body opposite from the hinge, the catch having a recessed top surface configured to receive the buckle, and
   wherein the second clamping member has a hook at a second lateral end of the downwardly-bowed body opposite from the hinge, the hook being configured to engage the arcuate lever.

3. The locking conduit clamp of claim 2, wherein the arcuate lever comprises a hinge portion configured to be received in an opening of the hook to hingedly couple the arcuate lever to the second clamping member.

4. The locking conduit clamp of claim 1, wherein the arcuate lever has a curvature corresponding to that of the recessed portion and is configured to be received within the recessed portion of the second clamping member when in the locked position, and
   wherein the buckle comprises an arcuate buckle configured to engage a catch of the first clamping member in the closed position.

5. The locking conduit clamp of claim 1, wherein a depth of the recessed portion relative to an outer surface of the second clamping member is equal to or less than a height of a tip of the arcuate lever, such that the arcuate lever does not protrude or only partially protrudes above the outer surface of the second clamping member when in a locked position.

6. The locking conduit clamp of claim 1, wherein the arcuate lever comprises a curved lip extending generally in an axial direction away from a side of a curved body of the arcuate lever, and
   wherein an end of the curved lip is curved toward the second clamping member is accommodated within the groove, when in the locked position.

7. The locking conduit clamp of claim 6, wherein a depth of the groove along the axial direction is less than a thickness of a curved end of the curved lip, such that, when the curved lip is received within the groove, a side of the curved end of the curved lip protrudes beyond a side surface of the second clamping member along the axial direction.

8. The locking conduit clamp of claim 1, wherein the second clamping member comprises an alignment projection at a second lateral end of the downwardly-bowed body opposite from the hinge, and
   wherein the first clamping member has an alignment receptacle at a second lateral end of the upwardly-bowed body opposite from the hinge, the alignment receptacle being configured to receive the alignment projection in the closed position to align the first and second clamping members.

9. The locking conduit clamp of claim 1, wherein the first and second clamping members have first and second grooves extending along an inner circumference of the first and second clamping members, respectively.

10. The locking conduit clamp of claim 9, wherein, when in the closed position, the first and second grooves form an annular groove.

11. The locking conduit clamp of claim 1, further comprising:
    a gripping member configured to engage with the first and second clamping members and to be accommodated within the opening defined by the upper and bottom pockets when in the closed position,
    wherein the gripping member is configured to receive a plurality of conduits.

12. The locking conduit clamp of claim 11, wherein the gripping member comprises a plurality of radial dividers extending radially away from a central axis of the gripping member, each divider of the plurality of radial dividers having a wide outer end and a tapered stem between the wide outer end and a center of the gripping member, and wherein the plurality of radial dividers define a plurality of receptacles therebetween, the plurality of receptacles being configured to receive the plurality of conduits.

13. The locking conduit clamp of claim 12, wherein each one of the plurality of receptacles has a concave portion.

14. The locking conduit clamp of claim 13, wherein the concave portion of each one of the plurality of receptacles is circularly arced.

15. The locking conduit clamp of claim 12, wherein at least one of the plurality of receptacles has a size different from an other one of the plurality of receptacles.

16. The locking conduit clamp of claim 12, wherein top surfaces of the wide outer ends form circular arcs having a same radius, and wherein the radius of the top surfaces corresponds to an inner radius of the opening defined by the upper and bottom pockets when in the closed position.

17. The locking conduit clamp of claim 1, further comprising:

an eyelet with an axially-extending through-hole configured to receive the harness to suspend the eyelet from the harness, wherein the eyelet is coupled to a neck portion of the first clamping member.

18. A locking conduit clamp comprising:

a first clamping member configured to be suspended from a harness and having an upwardly-bowed body defining a downward upper pocket and having a hinge at a first lateral end of the upwardly-bowed body;

a second clamping member having a downwardly-bowed body defining an upward lower pocket and being hingedly coupled to the first clamp member via the hinge at a first lateral end of the downwardly-bowed body, the second clamping member being configured to rotate about the hinge between an open position for receiving a conduit, and a closed position for surrounding and capturing the conduit in an opening defined by the upper and bottom pockets;

a latch comprising an arcuate lever hingedly coupled to the second clamping member, and a buckle hingedly coupled to the arcuate lever and configured to engage the first clamping member to lock the first and second clamping members in a locked position; and a gripping member configured to engage with the first and second clamping members and to be accommodated within the opening defined by the upper and bottom pockets when in the closed position, the gripping member being configured to receive a plurality of conduits, wherein the gripping member comprises a plurality of radial dividers extending radially away from a central axis of the gripping member, each divider of the plurality of radial dividers having a wide outer end and a tapered stem between the wide outer end and a center of the gripping member, and wherein the plurality of radial dividers define a plurality of receptacles therebetween, the plurality of receptacles being configured to receive the plurality of conduits, wherein each one of the plurality of radial dividers has a radial projection protruding radially away from a corresponding wider outer end, and wherein the radial projection is configured to be received by first and second grooves of the first and second clamping members.

19. A locking conduit clamp comprising:

a first clamping member configured to be suspended from a harness and having an upwardly-bowed body defining a downward upper pocket and having a hinge at a first lateral end of the upwardly-bowed body;

a second clamping member having a downwardly-bowed body defining an upward lower pocket and being hingedly coupled to the first clamp member via the hinge at a first lateral end of the downwardly-bowed body, the second clamping member being configured to rotate about the hinge between an open position for receiving a conduit, and a closed position for surrounding and capturing the conduit in an opening defined by the upper and bottom pockets;

a latch comprising an arcuate lever hingedly coupled to the second clamping member, and a buckle hingedly coupled to the arcuate lever and configured to engage the first clamping member to lock the first and second clamping members in a locked position; and an eyelet with an axially-extending through-hole configured to receive the harness to suspend the eyelet from the harness, wherein the eyelet is coupled to a neck portion of the first clamping member, and wherein the neck portion of the first clamping member has straight laterally-opposite side edges that are inclined downward and laterally-outward from the eyelet by an angle ranged from 15° to 45° relative to a vertical axis.

20. A locking conduit clamp comprising:

a first clamping member and having an upwardly-bowed body having a hinge;

a second clamping member having a downwardly-bowed body being hingedly coupled to the first clamp member via the hinge;

a latch configured to lock the first and second clamping members in a locked position; and a gripping member configured to be accommodated within an opening defined by the first and second clamping members when in a closed position, and comprising radial dividers extending radially away from a central axis of the gripping member, each divider of the plurality of radial dividers having a wide outer end and a radial projection protruding radially away from the wide outer end, wherein at least one of the first and second clamping members has a groove extending along an inner circumference of at least one of the first and second clamping members, the groove being configured to accommodate the radial projection of each divider.

* * * * *